United States Patent
Cakmakci et al.

(10) Patent No.: US 10,097,064 B2
(45) Date of Patent: Oct. 9, 2018

(54) MOTION SYSTEM

(71) Applicant: Melih Cakmakci, Cankaya, Ankara (TR)

(72) Inventors: Melih Cakmakci, Ankara (TR); Stefan Ristevski, Ankara (TR)

(73) Assignee: Melih Cakmakci, Cankaya, Ankara (TR)

( * ) Notice: Subject to any disclaimer, the term of this patent is extended or adjusted under 35 U.S.C. 154(b) by 124 days.

(21) Appl. No.: 15/254,863

(22) Filed: Sep. 1, 2016

(65) Prior Publication Data
US 2017/0066134 A1 Mar. 9, 2017

(30) Foreign Application Priority Data
Sep. 4, 2015 (TR) ................... 2015/11033

(51) Int. Cl.
B25J 5/00 (2006.01)
H02K 7/14 (2006.01)

(52) U.S. Cl.
CPC ............ H02K 7/14 (2013.01); B25J 5/00 (2013.01); H02K 2201/18 (2013.01)

(58) Field of Classification Search
CPC ............... A61B 34/30; A61B 1/00149; A61B 2034/2059; B25J 9/1607; B25J 9/1633; B25J 5/007; B60B 33/0049; B60B 33/06; B60B 33/0055; B06B 1/16; B06B 1/166
USPC ................. 700/259; 134/147, 153, 183, 33; 318/115, 135, 568.12, 568.16
See application file for complete search history.

(56) References Cited

U.S. PATENT DOCUMENTS

| | | | | |
|---|---|---|---|---|
| 5,323,867 A | * | 6/1994 | Griffin | ............ B25J 5/007 180/22 |
| 9,579,163 B2 | * | 2/2017 | Valdastri | ......... A61B 17/00234 |
| 2010/0270850 A1 | | 10/2010 | Brudniok | |
| 2014/0254896 A1 | * | 9/2014 | Zhou | ............... B25J 9/0006 382/124 |
| 2017/0172670 A1 | * | 6/2017 | Swarup | ............... A61B 34/30 |

* cited by examiner

Primary Examiner — Dalena Tran
(74) Attorney, Agent, or Firm — Notaro, Michalos & Zaccaria P.C.

(57) ABSTRACT

A motion system has at least one body, a motion unit that applies force to this body in a specified direction, and a control unit that controls the operation of the motion unit. The motion unit has at least one base connected to the body, at least one plate that is connected to the base, at least one first motion element that is controlled by control unit, at least one rotating mass that is connected to the plate and at least one second motion element that is controlled by the control unit.

14 Claims, 2 Drawing Sheets

MOTION SYSTEM

TECHNICAL FIELD

This invention is related to a motion system that can move in different directions.

PRIOR ART

The motion of electromechanical systems such as robots is provided by motion components such as electrical motors. In traditional systems, motion components are connected to wheels that provide system motion by means of to their rotation. However the maneuvering capability of such systems can be limited and some moves cannot be realized. Moreover, in traditional motion systems, a wide action space is needed to transport the system left and right due to the use of wheel based solutions. Therefore the application field of such systems is limited.

In the known art, omnidirectional wheels are used to improve the maneuvering capability of the motion system. As explained in patent US2010270850A1, omnidirectional wheels consist of many rotational elements that rotate at the external surface of the wheel cylinder at a specific angle. By controlling the speed of the rotating elements and the main cylinder, the wheel can be moved in different directions. However, the control mechanisms for omnidirectional wheels are not only complicated but also costly. On top of these, since they include many rotational elements, dimensions of omnidirectional wheels are also large. Therefore omnidirectional wheels cannot be used for systems that maneuvers especially in small spaces.

BRIEF DESCRIPTION OF THE INVENTION

In this invention, a motion system that comprises at least a body, a motion component generating force at a prescribed direction and a corresponding control unit is developed. The motion unit of said motion system comprises, at least one base connected to the body; at least one plate that is connected to said base so as to rotate about the first rotation axis; at least one first motion element that is controlled by control unit and that rotates said plate with respect to the base about the first rotation axis; at least one rotating mass that is connected to the plate so as to rotate about second rotation axis perpendicular to the first rotation axis and rotates as the plate rotates about the first rotation axis and at least one second motion element that enables the rotating mass move such that it rotates about the second rotation axis relative to the plate and that is controlled by the control unit The motion system developed in this invention moves the whole body in different directions by applying force to it in different directions. By this way the maneuvering capability of the motion system is increased making it suitable for different system application needs.

OBJECTIVE OF THE INVENTION

The objective of this invention is to develop a motion system that can move in different directions.

Another objective of this invention is to develop a motion system that can move an object to a specified position.

Another objective of this invention is to develop a compact motion system.

DESCRIPTION OF THE DRAWINGS

The application examples of the motion system developed in this invention is given in the included figures. In these figures, FIG. 1; shows a perspective view of the developed motion system FIG. 2; shows a perspective view of the motion unit used in the developed motion system.

The components in these figures are numbered as follows:

| Motion System | (S) |
|---|---|
| Body | (A) |
| Control Unit | (C) |
| Motion Unit | (M) |
| Base | (B) |
| First Rotation Axis | (E1) |
| Second Rotation Axis | (E2) |
| Plate | (1) |
| Rotating Mass | (2) |
| Support | (3) |
| Shaft | (4) |
| Connector | (5) |
| Steering Component | (6) |

DETAILED DESCRIPTION OF THE INVENTION

Motion systems can change their position by use of a motion unit such as an electric motor. In traditional applications, these motion systems contain wheels that are connected to the motion unit. However, in these traditional systems the motion capability is limited due to the linear motion constraint of the wheels. In this invention, a motion system that will be able to move in different directions is developed.

Figure 1:
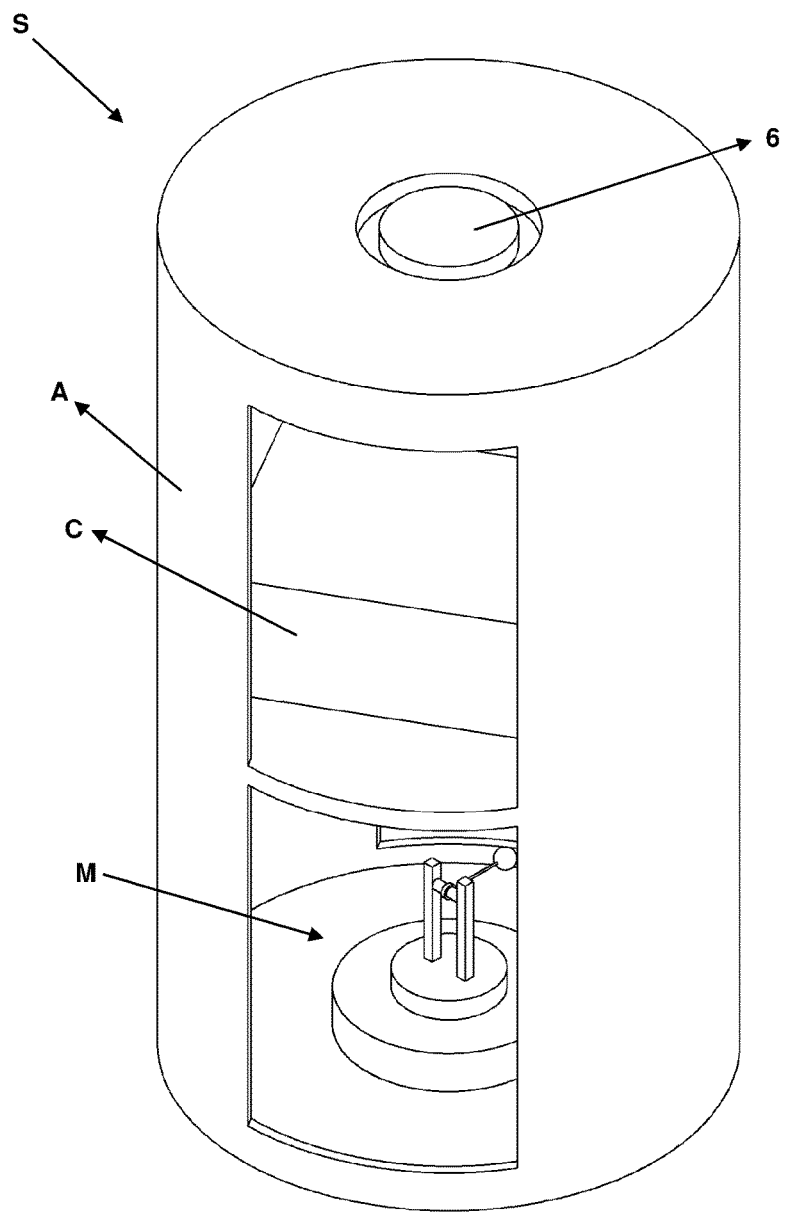
Figure 2:
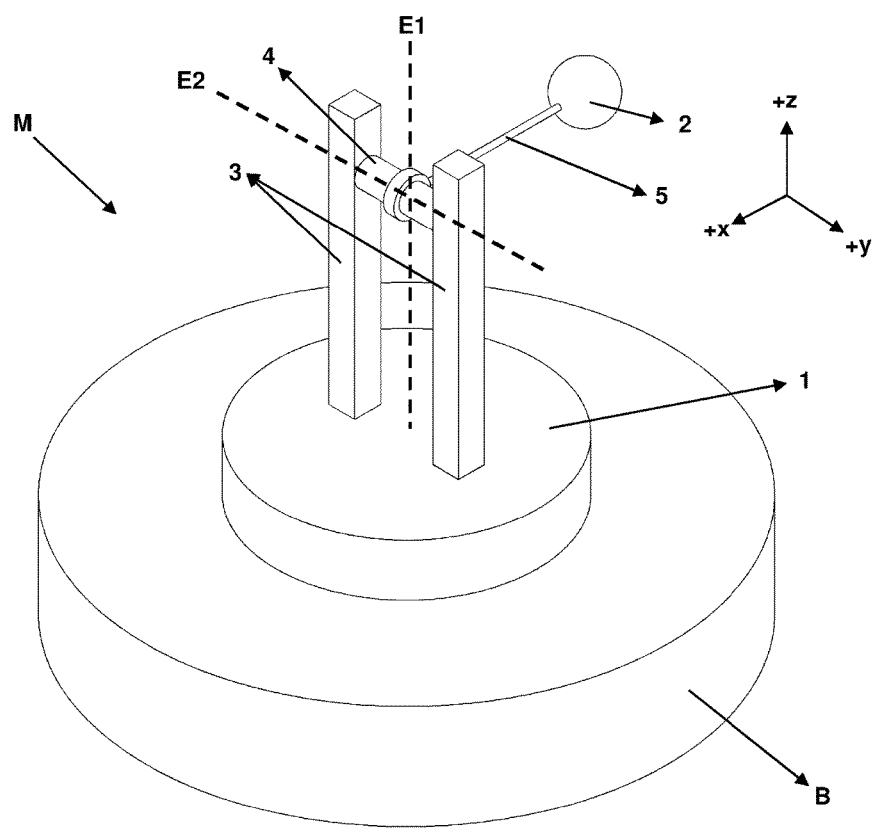

As shown in FIGS. 1 and 2, the motion system (S) comprises at least one body (A); a motion unit (M) that is on this body (A) and that applies force on this body (A) from different directions; and a control unit (C) that controls the operation of the motion unit (M). The motion unit (2), detailed view of which is given in FIG. 2, comprises at least one base (B) that is connected to the body (A); a plate (1) (preferably in cylindrical shaped) that is connected to the base (B) so as to rotate about the first rotation axis (E1); at least one first motion element (not shown in the figures) that is controlled by control unit (C) and that rotates said plate (1) with respect to the base (B) about the first rotation axis (E1); at least one rotating mass (2) that is connected to the plate (1) so as to rotate about second rotation axis (E2) perpendicular to the first rotation axis (E1) and rotates as the plate rotates about the first rotation axis (E1); and at least one second motion element (not shown in the figures) that enables the rotating mass (2) move such that it rotates about the second rotation axis (E2) relative to the plate (1) and that is controlled by the control unit (C)

In an example application of the motion system (S) developed with this invention the first rotation axis (E1) is parallel to the z-axis and the second rotation axis (E2) is parallel to the y-axis as shown in FIG. 2. In this application, a force is applied to the base (B) based on the (clockwise or counterclockwise) rotation of the rotating mass (2) relative to the plate (1) about the second rotation axis (E2) using the centrifugal force. Likewise, based on the relative rotational motion between the plate (1) and the rotating mass (2) connected to the plate (1) about the first axis (E1) a centrifugal force is applied to the base (B). The forces that are applied to the base (B) are transferred to the body (A) through the mechanical connection. These transmitted forces cause the body (A) to move on the x-y plane by sliding. Using the control unit (C) the direction of rotation and the rotation speed of the rotating mass (2) is controlled.

This controlled motion helps to control the direction and the magnitude of the force transmitted to the body (A) from base (B). In alternative applications of the invention presented here an object can be placed on or at one side of the system so that the object can be moved to a desired position moving with the body (A).

In one of the preferred applications of the invention, the motion unit (M) includes one support element (3) that spans from the plate (1) parallel to the (E1) axis, a shaft (4) that is connected to this support element (3) so that it rotates in the (E2) direction and one connector element (5), which is preferably in the form of a rod, that connects the shaft (4) to the rotating mass (2). In this application the length of the connector affects the amount of force applied to the body (A) when the rotating mass (2) rotates about the (E1) and (E2) axis. For this reason the length of the connector can be used to control the sensitivity of the force applied in the body (A).

In an example application of the invention, the first motion element that makes the plate (1) rotate with respect to the base (B) has no limits (that is, it can rotate more than) 360°. In this application a force is applied to the body (A) as the rotating mass (2) rotates about the (E1) axis. This enables the body (A) to rotate about the first axis.

In another example application of the invention, the first motion element has limited rotation capabilities (for example the motion element can only rotate between 0-360 degrees). In this application, first motion element changes the direction of the second rotating axis (E2) by rotating the rotating mass (2) that is connected to the plate (1) about the first axis (E1). In this way, the force that is applied to the body (A) is obtained by the spinning of the rotating mass (2) about the second axis (E2) by the motion element. Here, the first motion element changes the direction of the force provided by the rotating mass (2) rotating about the second rotation (E2) axis. In this application, since the force applied to the body (A) can be controlled, the direction of motion of the motion system (S) is also controlled. However in this application the motion system can not provide rotation of the motion system (S) about itself. For this reason in a preferred application of the invention, the motion system (S) contains a steering component (6) that helps the body (A) to rotate about at least one axis of the system (S). This steering component (6) preferably contains at least one vibration motor. In the example application of the invention shown in FIG. (1), the steering component (6) provides rotation motion of the body (A) on the x-y plane. In the alternative applications of the invention, the steering component (6) provides the rotational motion of the system (S) about x-z and/or y-z planes for example in the mediums where no gravity exists.

In a preferred application of the invention, the motion system (S), contains a friction reducer (not shown in the Figures) preferably underneath the body (A) (for example the side of the body (A) that is directed to the surface) that decreases the friction between the body (A) and the surface the body (A) is positioned so that the motion in this surface is improved. This friction reducer preferably contains at least one ball caster. The ball caster assembly contains a sphere shaped wheel that has the ability to rotate different directions and helps the body (A) to move in different directions easily.

In another preferred application of the invention, the motion system (S) contains a sensor (not shown in the figures) that measures the amount and direction of motion of the body (A). This sensor is connected to the control unit (C). This sensor can be an accelerometer like device which is integrated to the body (A) as well as an external camera unit that is independent from the body (A). In this application the sensor motion information is used to control the magnitude and direction of the force that is applied to the body (A) by the controller unit (C).

In another preferred application of the invention, the motion systems (S) can be connected to each other. In this way, an object that is too heavy for one motion system (S) can be moved by more than one motion system (S). In this application, a connection system is needed in order to connect one motion system (S) to another motion system (S). In the example application this connection system contains at least one slot and one extension.

By settling of one extension in the motion system (S) to a slot in another motion system (S) at least two motion systems are connected to each other.

In another preferred application of the invention, the motion system (S) has a compact structure. In this application the dimensions of the body (A) can be as small as a cube that has a dimension of 5 cms or less. The motion unit (M), the controller unit (C) are selected small in dimensions accordingly so that it can be located inside the body (A). In this way unit the controller unit (C) can be programmed by using a wireless controller and the motion system (S) can be directed in hard-to-reach places. The motion system (S) developed in this invention can be maneuvered to different directions by applying forces to the body (A) in different directions with the use of motion unit (M). In this way the maneuvering capabilities of the system is increased.

The invention claimed is:

1. A motion system (S) comprising at least one body (A); at least one motion unit (M) that is located on the body (A) and applies the body a force from a specified direction and a control unit (C) that controls an operation of the motion unit (M); characterized in that the motion unit (M) comprises, at least one base (B) connected to the body (A);
at least one plate (1) that is connected to said base (B) so as to rotate about the first rotation axis (E1);
at least one first motion element that is controlled by control unit (C) and that rotates said plate (1) with respect to the base (B) about the first rotation axis (E1);
at least one rotating mass (2) that is connected to the plate (1) so as to rotate about second rotation axis (E2) perpendicular to the first rotation axis (E1) and rotates as the plate rotates about the first rotation axis (E1) and
at least one second motion element that enables the rotating mass (2) move such that it rotates about the second rotation axis (E2) relative to the plate (1) and that is controlled by the control unit (C), wherein, a force is applied to the base (B) based on the rotation of the rotating mass (2) relative to the plate (1) about the second rotation axis (E2) using the centrifugal force and another force is applied to the base (B) based on the relative rotational motion between the plate (1) and the rotating mass (2) connected to the plate (1) about the first axis (E1) using the centrifugal force and wherein, the forces that are applied to the base (B) are transferred to the body (A) causing the body (A) to move by sliding.

2. The motion system (S) according to claim 1 characterized in that the plate (1) is in cylindrical shape.

3. The motion system (S) according to claim 1 characterized in that; the motion unit (M) comprises a support (3) element that extents from the plate (1) as a protrusion; at least one shaft (4) that is connected to the support element (3) so as to rotate about the second axis (E2) and at least one connecting element (5) that connects the rotating mass (2) to the shaft (4) element.

4. The motion system (S) according to claim 3 characterized in that the support (3) element has a structure such that it extends from the plate (1) parallel to the first rotation axis (E1).

5. The motion system (S) according to claim 3 characterized in that the connector element (5) has the form of a rod.

6. The motion system (S) according to claim 1 characterized in that it contains at least one steering element (6) that enables the body (A) to rotate about at least one axis.

7. The motion system (S) according to claim 1 characterized in that the steering element (6) contains at least one vibration motor.

8. The motion system (S) according to claim 1 characterized by comprising at least one friction reducer that eases the movement of the body on the surface by reducing the friction between the body (A) and the surface.

9. The motion system (S) according to claim 8 characterized in that the friction reducer comprises at least one ball caster.

10. The motion system (S) according to claim 1 characterized by comprising at least one sensor that senses the direction and/or the magnitude of motion and is connected to the control unit (C).

11. The motion system (S) according to claim 10 characterized in that the sensor is an accelerometer placed on the body (A).

12. The motion system (S) according to claim 10 characterized in that the sensor is an image acquisition system independent of the body (A).

13. The motion system (S) according to claim 1 characterized by comprising at least one connecting element enables it to be connected to at least one other motion system (S).

14. The motion system (S) according to claim 13 characterized by comprising at least one extension and at least one slot as said connection system.

* * * * *